United States Patent
Stolpe et al.

(10) Patent No.: US 8,920,143 B2
(45) Date of Patent: Dec. 30, 2014

(54) ELECTRONICALLY COMMUTATED DC MOTOR FOR A LIQUID PUMP

(75) Inventors: Thomas Stolpe, Eckental (DE); Helmut Kellermann, Langenzenn (DE); Olai Ihle, Eckental (DE); Gerhard Walter, Fürth (DE); Klaus Weiske, Nürnberg (DE)

(73) Assignee: Buhler Motor GmbH, Nuremberg (DE)

( * ) Notice: Subject to any disclaimer, the term of this patent is extended or adjusted under 35 U.S.C. 154(b) by 633 days.

(21) Appl. No.: 13/137,435

(22) Filed: Aug. 16, 2011

(65) Prior Publication Data

US 2012/0045351 A1 Feb. 23, 2012

(30) Foreign Application Priority Data

Aug. 17, 2010 (DE) .......................... 10 2010 034 563

(51) Int. Cl.
*F04D 13/06* (2006.01)
*F04D 25/06* (2006.01)
*H02K 3/32* (2006.01)
*H02K 11/00* (2006.01)
*H02K 3/30* (2006.01)
*H02K 3/52* (2006.01)
*H02K 5/22* (2006.01)

(52) U.S. Cl.
CPC ............ *H02K 3/325* (2013.01); *H02K 11/0005* (2013.01); *H02K 11/0073* (2013.01); *H02K 3/30* (2013.01); *H02K 3/522* (2013.01); *H02K 5/225* (2013.01)
USPC ..................... 417/423.7; 417/423.14; 310/64; 310/85

(58) Field of Classification Search
CPC . A61M 1/101; A61M 1/1012; A61M 1/1031; F04D 13/06; F04D 13/0606; F04D 13/0666
USPC ....... 417/423.1, 423.7, 423.14; 310/64, 68 R, 310/71, 85, 86, 254.1
See application file for complete search history.

(56) References Cited

U.S. PATENT DOCUMENTS 7,692,355 B2 * 4/2010 Ihle et al. ...................... 310/257
7,969,060 B2 * 6/2011 Ihle et al. ...................... 310/257

(Continued)

FOREIGN PATENT DOCUMENTS

| DE | 10 2004 037 906 A1 | 3/2006 |
| DE | 10 2008 064 159 B3 | 1/2010 |
| JP | 63283447 A | 11/1988 |

*Primary Examiner* — Peter J Bertheaud
(74) *Attorney, Agent, or Firm* — Westerman, Hattori, Daniels & Adrian, LLP

(57) ABSTRACT

An electronically commutated DC motor for a liquid pump, comprising a pump housing, a suction connection and a pressure connection, a substantially disk-shaped pump rotor mounted rotatably in the pump housing, the rotor comprising an impeller having a plurality of pump vanes and a permanent magnet, a partition separating a pump space from a dry space, wherein the partition is disposed in an axial gap between the pump rotor and a plurality of axially parallel oriented stator poles of the DC motor, which are each provided with an insulating body and a stator winding, the stator poles adjoin a stator yoke, which is connected to a metallic heat-conducting body, and the stator containing the stator poles, the stator windings, the stator yoke and the heat-conducting body is disposed in a motor housing made of plastic material. By providing that the stator is surrounded by a flexible foil, and at least a large part of the foil is disposed inside the motor housing radially around the stator windings, a simple solution ensures good shielding against interference in an existing electronically commutated DC motor, without requiring modifications to the existing design.

16 Claims, 4 Drawing Sheets

(56) References Cited

U.S. PATENT DOCUMENTS

| | | | |
|---|---|---|---|
| 8,002,522 B2 * | 8/2011 | Ihle et al. | 415/200 |
| 8,125,118 B2 * | 2/2012 | Nissen | 310/260 |
| 8,174,157 B2 * | 5/2012 | Ihle et al. | 310/71 |
| 8,203,242 B2 * | 6/2012 | Ihle et al. | 310/71 |
| 8,282,367 B2 * | 10/2012 | Ihle et al. | 417/423.8 |
| 8,575,816 B2 * | 11/2013 | Zeinlinger et al. | 310/260 |
| 2010/0158724 A1 * | 6/2010 | Ihle et al. | 417/423.7 |

* cited by examiner

ELECTRONICALLY COMMUTATED DC MOTOR FOR A LIQUID PUMP

CROSS-REFERENCE TO RELATED APPLICATIONS

The present patent application claims priority from Germany Application No. 10 2010 034 563.6, filed Aug. 17, 2010, which is incorporated herein by reference in its entirety.

BACKGROUND OF THE INVENTION

1. Field of the Invention

The invention relates to an electronically commutated DC motor for a liquid pump, comprising a pump housing having a suction connection and a pressure connection, a substantially disk-shaped pump rotor mounted rotatably in the pump housing, the rotor comprising an impeller having a plurality of pump vanes and a permanent magnet, a partition separating a pump space from a dry space, wherein the partition is disposed in an axial gap between the pump rotor and a plurality of axially parallel oriented stator poles of the DC motor, which are each provided with an insulating body and a stator winding, the stator poles adjoin a stator yoke, and the stator containing the stator poles, the stator windings and the stator yoke is disposed in a motor housing made of plastic material.

2. Description of Related Art Including Information Disclosed Under 37 CFR §§1.97 and 1.98

An electronically commutated DC motor of the type in question is known from US 2010/0158724 incorporated by reference herein. It comprises a plastic housing, so that electromagnetic radiation is emitted virtually unimpaired by the stator windings.

It is known to use electric motors comprising metal housings to shield against interference. Metal housings, however, are disadvantageous with respect to noise emissions, notably structure-borne noise transmission.

BRIEF SUMMARY OF THE INVENTION

It is therefore the object of the invention to find a simple possibility to ensure good shielding against interference in an existing electronically commutated DC motor, without requiring modifications to the existing design, wherein good noise properties are achieved, low inventory is required, and simple shaping and assembly are possible.

A flexible foil, designed as a metal foil or as a metallized plastic film, is disposed inside the motor housing radially around the stator windings to improve the EMC properties. Using a flexible foil increases the weight of the motor insignificantly, and given the low thickness, the foil can even be subsequently mounted in existing motors. A copper or flexible aluminum foil having a thickness of approximately 0.1 mm or less, for example, is suited as the foil. A mesh comprising a mixture of plastic and metal fibers is also conceivable.

According to the invention, parts of the foil are disposed between the stator yoke and a plate or between the stator yoke and fastening bushings protruding from the partition. In these areas, the flexible foil is very easy to mechanically stabilize.

The foil may also be designed in the shape of a crucible, wherein the crucible bottom is preferably disposed between a contact support and a circuit board or between a circuit board and the motor housing. In this embodiment, the plate may be eliminated, making less expensive production possible. So as to be able to mount the crucible, at least cut-outs for connecting contacts are required in the crucible bottom. Depending on the installation situation, further cut-outs may need to be provided for fastening means or cable bushings. The foil can also be inserted and fixed directly in the motor housing, notably when it is designed in the shape of a crucible. This fixation can be carried out by hot stamping plastic protrusions or by gluing. The motor housing prepared in this way is then mounted over the stator.

So as to achieve improved interference suppression, the foil is electrically connected to the stator yoke and/or the plate.

Advantageously, the foil is designed at the end thereof facing the partition to receive an annular shoulder protruding from the partition, whereby the foil can be oriented in the radial direction before the motor housing is mounted.

A preferred fastening possibility is provided in that the foil comprises fastening lugs that are bent perpendicularly toward the axis of symmetry of the foil, which are held between the stator yoke and the plate or between the stator yoke and the fastening bushings.

By fastening the foil by means of screws between the stator yoke and the plate, or between the stator yoke and the fastening bushings, the foil is held securely, and additionally the electrical contact between the stator yoke and/or the plate is improved when it is established, as proposed above, by means of the fastening lugs.

Advantageously, the fastening lugs are disposed in recesses of a contact support or a circuit board, so that also anti-turn protection is provided during assembly and the foil cannot slide out of place during the installation of further parts.

The foil can be a mold-dependent component or a component that is bent from a flat strip and connected at the ends. In the latter case, the ends can be inserted into each other, in a manner known per se, by means of semi-slots, whereby the flexible strip is brought into a tubular shape.

BRIEF DESCRIPTION OF THE SEVERAL VIEWS OF THE DRAWINGS

One embodiment of the invention will be explained in more detail hereinafter with reference to the drawings. In the figures.

DETAILED DESCRIPTION OF THE INVENTION

Figure 1:
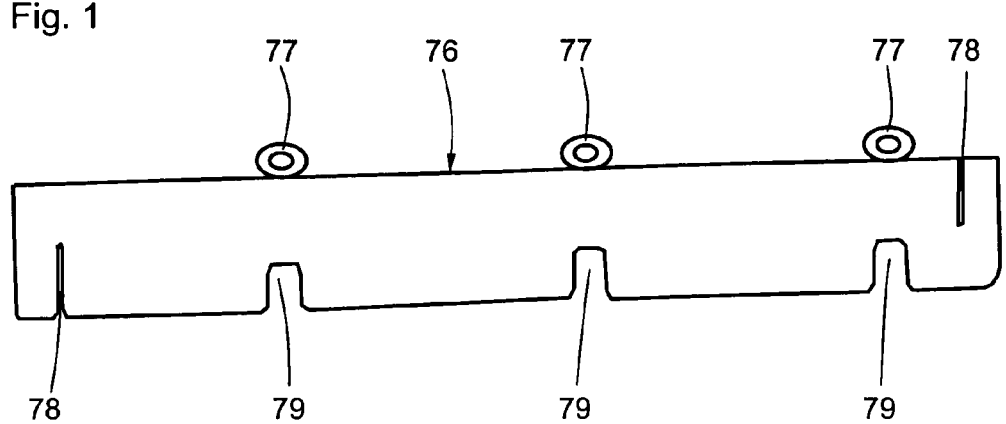
FIG. 1 is a foil designed as a strip.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
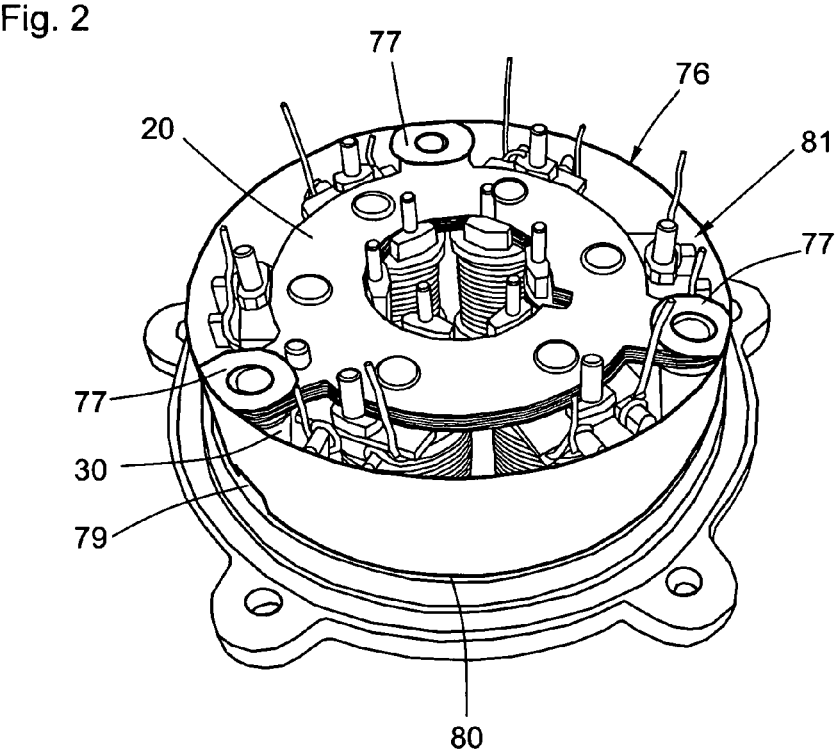
FIG. 2 is the foil in the installed position, from the prior art.

With reference to FIGS. 1 and 2, according to the invention, parts of the foil 76 are disposed between the stator yoke 20 and a plate 25 or between the stator yoke and fastening bushings 30 protruding from the partition. In these areas, the flexible foil is very easy to mechanically stabilize.

The foil 76 may also be designed in the shape of a crucible, wherein the crucible bottom is preferably disposed between a contact support 22 and a circuit board 28 or between a circuit board 28 and the motor housing 50. In this embodiment, the plate 25 may be eliminated, making less expensive production possible. So as to be able to mount the crucible, at least cut-outs for connecting contacts 26 are required in the crucible bottom. Depending on the installation situation, further cut-outs may need to be provided for fastening means or cable bushings. The foil 76 can also be inserted and fixed directly in the motor housing, notably when it is designed in the shape of a crucible. This fixation can be carried out by hot stamping plastic protrusions or by gluing. The motor housing prepared in this way is then mounted over the stator.

So as to achieve improved interference suppression, the foil 76 is electrically connected to the stator yoke 20 and/or the plate 25.

Advantageously, the foil 76 is designed at the end thereof facing the partition 11 to receive an annular shoulder protruding from the partition 11, whereby the foil 76 can be oriented in the radial direction before the motor housing is mounted.

A preferred fastening possibility is provided in that the foil 76 comprises fastening lugs 77 that are bent perpendicularly toward the axis of symmetry of the foil, which are held between the stator yoke 20 and the plate 25 or between the stator yoke 20 and the fastening bushings 30.

By fastening the foil 76 by means of screws between the stator yoke 20 and the plate 25, or between the stator yoke 20 and the fastening bushings 30, the foil is held securely, and additionally the electrical contact between the stator yoke 20 and/or the plate 25 is improved when it is established, as proposed above, by means of the fastening lugs 77.

Advantageously, the fastening lugs 77 are disposed in recesses 45 of a contact support 22 or a circuit board, so that also anti-turn protection is provided during assembly and the foil cannot slide out of place during the installation of further parts.

The foil 76 can be a mold-dependent component or a component that is bent from a flat strip and connected at the ends. In the latter case, the ends can be inserted into each other, in a manner known per se, by means of semi-slots, whereby the flexible strip is brought into a tubular shape.

FIG. 1 shows a strip-shaped foil 76 comprising angled fastening lugs 77, semi-continuous slots 78 open toward different sides, and recesses 79 so as to enable the assembly around the fastening bushings.

FIG. 2 shows a foil 76 in the installed state, wherein this has been brought into a tubular shape. Fastening lugs 77, which are angled 90° in the direction of the motor axis and moved to agree with fastening means 29 (see FIG. 5) of a stator yoke 20 are also shown.

FIGS. 3 to 13 show a known electronically commutated DC motor, which does not comprise the foil according to the invention, but which is suited for installation of the same without design changes.

Figure 3:
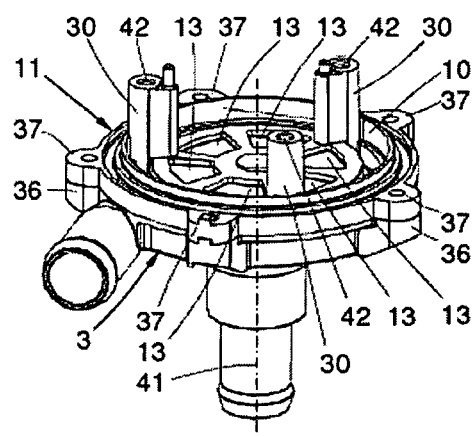
FIG. 3 is a pump housing comprising a mounted partition.

FIG. 3 shows an assembly of the known electronically commutated DC motor comprising a mounted partition 11, which separates a pump space from a dry space 10. The partition 11 comprises mounting eyes 37, which correspond to mounting eyes 36 of the pump housing 3. The partition 11 includes depressions 13 for receiving stator poles, more particularly the pole shoes thereof. The partition 11 is further designed to be integral with three fastening bushings 30 provided with internal threads 42, the bushings extending parallel about a motor axis 41 out of the partition plane.

Figure 4:
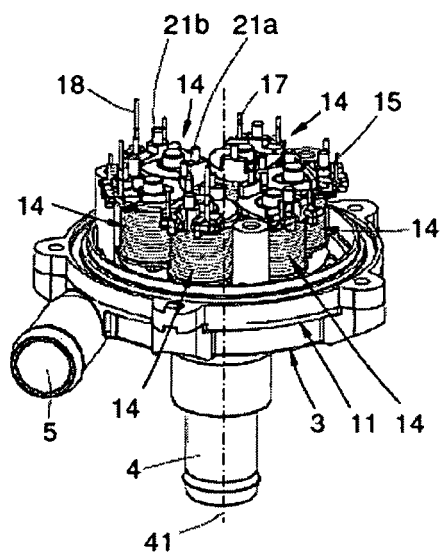
FIG. 4 is the assembly from FIG. 3 with mounted wound stator poles.

FIG. 4 shows the assembly from FIG. 3 with six mounted, wound stator poles 14, which are axially parallel oriented and distributed evenly about the motor axis 41. Each of the stator poles 14 is surrounded by an insulating body 15, which is provided with a stator winding 16. The windings are mechanically fixed to the insulating body 15 and the ends 17, 18 thereof extend parallel to the motor axis 41. First winding ends 17 end in a first plane, while second winding ends 18 are designed longer than the first winding ends 17 and end in a second plane. The insulating bodies 15 are designed to be integral with receptacles 21a, 21b, which extend axially parallel from the side facing away from the pump in a pin-like manner. FIGS. 16 to 19 present a further description of the stator poles 14.

Figure 5:
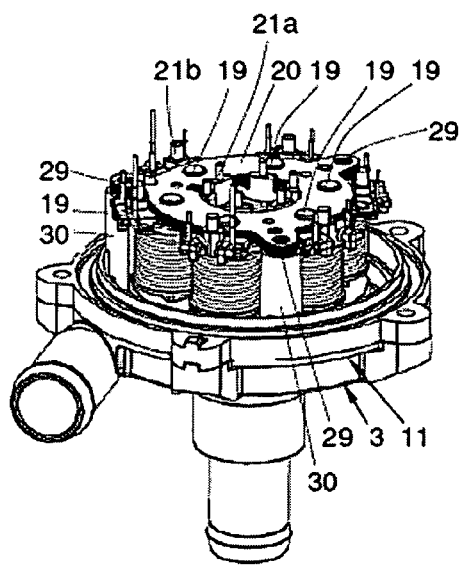
FIG. 5 is the assembly from FIG. 4 with a mounted stator yoke.

FIG. 5 shows the assembly from FIG. 4, with a mounted stator yoke 20, which includes a laminated core composed of a plurality of identical sheets. The stator yoke 20 is made up of a fastening means 29, which are composed of three radial protrusions with disk-shaped punch-outs, that coincide with the internal threads 42 of the fastening bushings 30. In addition to the internal threads 42, protrusions are provided on two fastening bushings 30, the protrusions having different dimensions and being intended to prevent incorrect installation of the stator yoke 20. Each pole has a receiving mandrel 19, which engages with a correspondingly designed cut-out of the stator yoke 20. The stator yoke 20 has a ring-shaped design and extends within the circles defined by the receptacles 21a and 21b. The stator yoke 20 is secured with the stator poles 14 by a forming operation, such as press-fit stemming, to prevent loosening.

Figure 6:
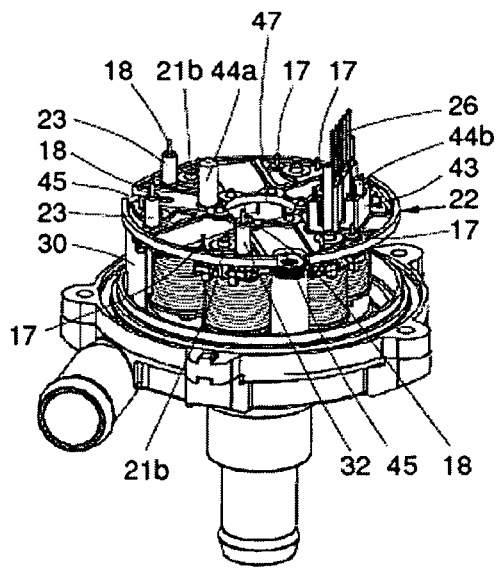
FIG. 6 is the assembly from FIG. 5 with a mounted contact support.

FIG. 6 shows the assembly from FIG. 5 with a mounted contact support 22 made of plastic material. The contact support 22 is designed to be integral with contact receptacles 43, receiving mandrels 23, apertures for the receptacles 21a and 21b of the insulating bodies, apertures for the winding ends 17, recesses 45 in the region of the fastening bushings 30, a central cut-out 47, and centering pins 44a, 44b. The receiving mandrels 23 are hollow and accommodate the second winding ends 18, which in the mounted state of the contact support project considerably from the hollow receiving mandrels 23. The contact receptacles are shaped to allow the U-shaped contacts to become interlocked therein. Some of the U-shaped connecting contacts 26 end on one side on a first side directed toward the motor axis and on the other side in a connector plane, and some of the U-shaped connecting contacts 26 end on one side on a second side facing away from the motor axis and on the other side in the connector plane.

Figure 7:
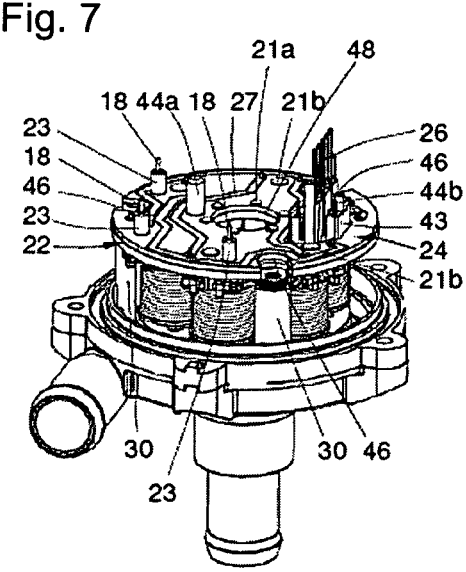
FIG. 7 is the assembly from FIG. 6 with a mounted circuit board.

FIG. 7 shows the assembly from FIG. 6 with a mounted circuit board 24, which is substantially designed with the same apertures and recesses as the contact support 22. In detail, the circuit board 24 comprises recesses 46 in the region of the fastening bushings 30, a central cut-out 48 and various apertures for the receptacles 21a, 21b of the insulating bodies, for the hollow receiving mandrels 23 of the contact support and for contact apertures for the electrical and mechanical connection of the first shorter winding ends 17 to the circuit board, in particular with solder lands, some of which are connected to each other by means of conductor tracks 27. Moreover, an aperture for the contact receptacles 43 and the centering pin 44a is provided. After a hot-forming process, the receptacles 21a and 21b are formed so that the circuit board 24 and the contact support 22 are rigidly positively connected to the six insulating bodies, wherein the receptacles 21a, 21b are deformed in a rivet head-like manner.

Figure 8:
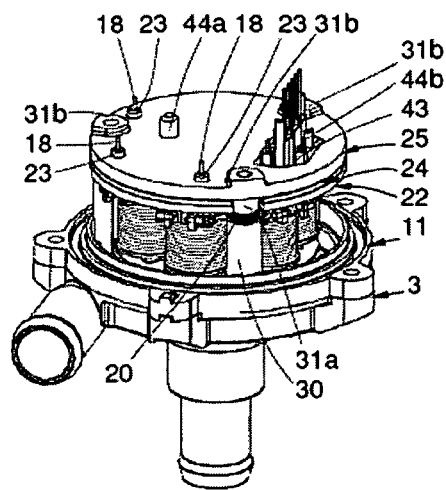
FIG. 8 is the assembly from FIG. 7 with a mounted plate.

FIG. 8 shows the assembly from FIG. 7 with a mounted plate 25. The plate 25 is composed of aluminum and is provided with cut-outs for the hollow receiving mandrels 23, the centering pin 44a, and the contact receptacles 43. Moreover, the plate 25 is designed to be integral with spacers 31a, which engage with recesses 45 of the contact support 22 and recesses 46 of the circuit board 24 and extend up to the yoke 20. On the side of the plate located opposite of the spacers 31a, further spacers 31b are provided, which are used to receive a further circuit board. In the embodiment shown, the plate comprises a first substantially disk-shaped region and a second substantially hollow cylindrical region, which centrally adjoins the disk-shaped region and extends over the central cut-out 48 of the circuit board 24 and the central cut-out 47 of the contact support and a central cut-out of the stator yoke up to the partition 11.

Figure 9:
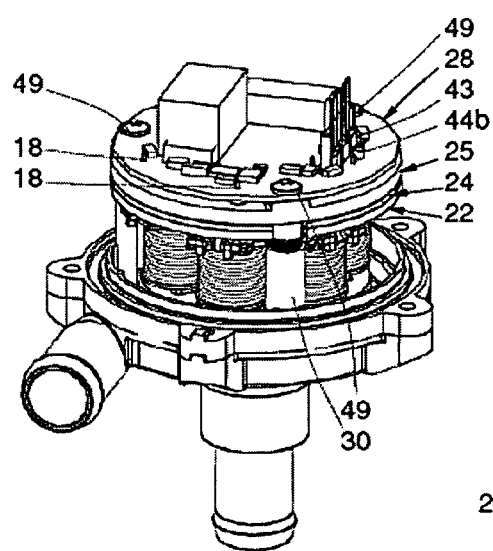
FIG. 9 is the assembly from FIG. 8 with an assembled circuit board.

FIG. 9 shows the assembly from FIG. 8 with an assembled circuit board 28. The circuit board 28 includes contact apertures for the passage of the winding ends 18, which are electrically and mechanically connected to the circuit board 28 on solder lands. The circuit board 28 further comprises an aperture for the contact receptacles 43. The circuit board 28 is seated axially against the spacers 31b and radially against the centering pins 44a, 44b and is screwed to the fastening bushings 30 by means of screws 49, whereby not only the circuit board 28, but also the plate 25 and the stator yoke are fixed.

Figure 10:
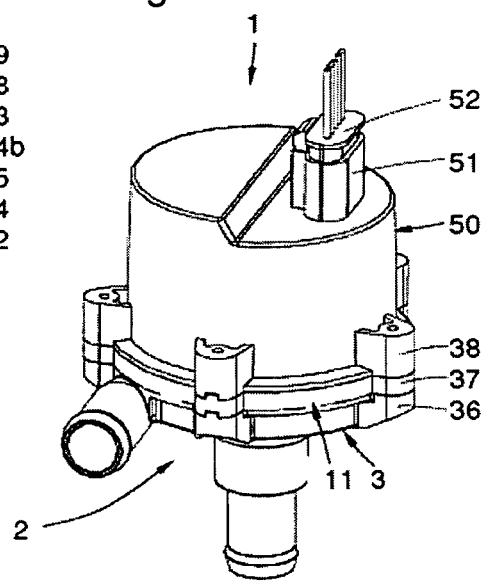
FIG. 10 is the assembly from FIG. 9 with a mounted motor housing.

FIG. 10 shows the assembly from FIG. 9 with the mounted motor housing 50, which is designed to be integral with a plug housing 51, in which a plug 52 is inserted. The motor housing is also designed to be integral with mounting eyes 38, wherein these agree with the mounting eyes 37 of the partition 11 and the mounting eyes 36 of the pump housing. FIG. 10 also agrees with an embodiment of the present invention.

Figure 11:
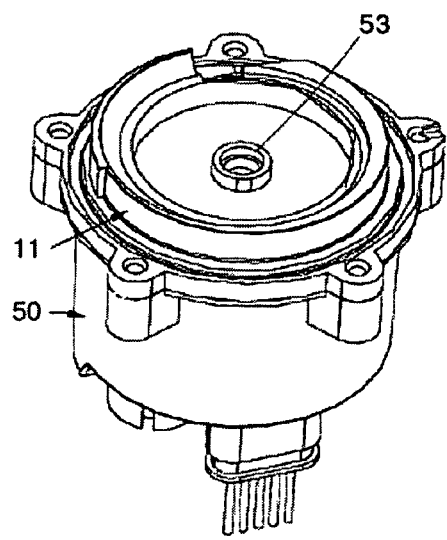
FIG. 11 is a view from the opposite perspective onto the partition.

FIG. 11 shows a view from the opposite perspective onto the partition 11 with the motor housing adjoining the same. The partition 11 and the motor housing delimit the dry space, in which the stator of the DC motor is located. The partition 11 is designed to be integral with a bearing receptacle 53 for receiving an axial bearing for support of the pump rotor.

Figure 12:
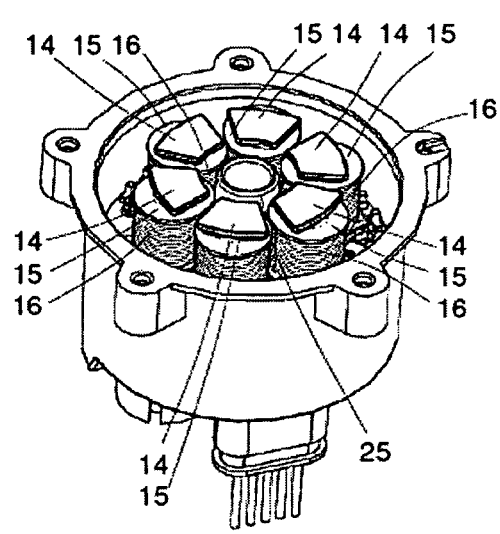
FIG. 12 is a view from the same perspective onto the stator poles.

FIG. 12 shows a view from the same perspective onto the stator poles 14, comprising the insulating bodies 15, the windings 16, and the hollow cylindrical region of the plate 25.

Figure 13A:
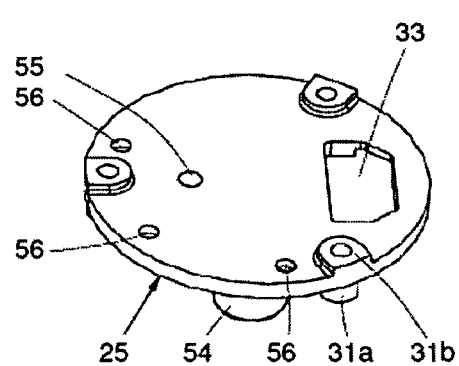
FIGS. 13*a*, 13*b* are views of the plate.
Figure 13B:
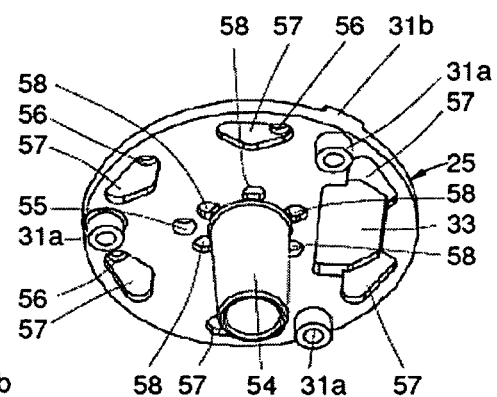

FIGS. 13a, 13b show views of the plate 25, comprising an aperture 55 for the centering pin 44a, three apertures 56 for the receiving mandrels 23 of the contact support, a plug cut-out 33, spacers 31a and 31b, and a hollow cylindrical region 54, which is disposed centrally on the plate 25. FIG. 13b is provided with additional large recesses 57 and small recesses 58 for the soldering areas and rivet heads.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically disclosed.

LIST OF REFERENCE NUMERALS

| 1 | DC motor |
| 2 | Liquid pump |
| 3 | Pump housing |

-continued

LIST OF REFERENCE NUMERALS

| 4 | Suction connection |
| 5 | Pressure connection |
| 10 | Dry space |
| 11 | Partition |
| 13 | Depressions |
| 14 | Stator pole |
| 15 | Insulating body |
| 16 | Stator winding |
| 17 | First winding end |
| 18 | Second winding end |
| 19 | Receiving mandrel |
| 20 | Stator yoke |
| 21a | Receptacle |
| 21b | Receptacle |
| 22 | Contact support |
| 23 | Hollow receiving mandrel |
| 24 | First circuit board |
| 25 | Plate |
| 26 | Connecting contacts |
| 27 | Conductor track |
| 28 | Mounted circuit board |
| 29 | Fastening means |
| 30 | Fastening bushing |
| 31a | Spacer |
| 31b | Spacer |
| 33 | Plug cut-out |
| 36 | Mounting eyes |
| 37 | Mounting eyes |
| 38 | Mounting eyes |
| 41 | Motor axis |
| 42 | Internal thread |
| 43 | Contact receptacles |
| 44a | Centering pin |
| 44b | Centering pin |
| 45 | Recesses in the contact support |
| 46 | Recesses in the circuit board |
| 47 | Central cut-out in the support |
| 48 | Central cut-out in the circuit board |
| 49 | Screw |
| 50 | Motor housing |
| 51 | Plug housing |
| 52 | Plug |
| 53 | Bearing receptacle |
| 54 | Hollow cylindrical region |
| 55 | Aperture for centering pin |
| 56 | Aperture for receiving mandrel |
| 57 | Large recess |
| 58 | Small recesses |
| 76 | Foil |
| 77 | Fastening lug |
| 78 | Slot |
| 79 | Recess |
| 80 | Annular shoulder |
| 81 | Stator |

What is claimed is:

1. An electronically commutated DC motor for a liquid pump, the motor comprising:
a motor housing;
a stator yoke;
a pump housing attached to the motor housing, the pump housing having a suction connection and a pressure connection;
a plurality of axially parallel oriented stator poles, the stator poles being provided with an insulating body and a stator winding, the stator poles adjoining the stator yoke;
a substantially disk-shaped pump rotor mounted rotatably in the pump housing, the rotor including an impeller having a plurality of pump vanes and a permanent magnet;
a pump space defined in the pump housing;
a dry space defined in the motor housing;

a stator containing the stator poles, the stator windings and the stator yoke being disposed in the motor housing;

a partition separating the pump space from the dry space, the partition being disposed in an axial gap between the pump rotor and the plurality of axially parallel oriented stator poles, wherein the stator is surrounded by a flexible foil, and at least a large part of the foil is disposed inside the motor housing radially around the stator windings; and fastening bushings protruding from the partition, wherein parts of the foil are disposed between the stator yoke and fastening bushings.

2. The DC motor of claim 1, wherein the flexible foil is a metal foil.

3. The DC motor of claim 1, wherein the flexible foil is a metallized plastic film.

4. The DC motor according to claim 1, wherein the foil is designed as a crucible.

5. The DC motor according to claim 1, wherein the foil is electrically connected to the stator yoke.

6. The DC motor according to claim 1, wherein the foil at the end thereof facing the partition is received inside an annular shoulder protruding from the partition.

7. The DC motor according to claim 1, characterized in that the foil is fastened by means of screws between the stator yoke and the fastening bushings.

8. A DC motor according to claim 1, wherein an electrical connection to the plate is established by way of the fastening lugs.

9. The DC motor according to claim 8, wherein the fastening lugs are disposed in recesses of a contact support.

10. The DC motor according to claim 8, wherein the fastening lugs are disposed in recesses of a circuit board.

11. The DC motor according to claim 1, wherein the foil is designed as a mold-dependent component.

12. The DC motor according to claim 1, wherein the foil is designed as a component that is bent from a flat strip and connected at the ends.

13. An electronically commutated DC motor for a liquid pump, the motor comprising:

a motor housing;
a stator yoke;
a pump housing attached to the motor housing, the pump housing having a suction connection and a pressure connection;

a plurality of axially parallel oriented stator poles, the stator poles being provided with an insulating body and a stator winding, the stator poles adjoining the stator yoke;

a substantially disk-shaped pump rotor mounted rotatably in the pump housing, the rotor including an impeller having a plurality of pump vanes and a permanent magnet;

a pump space defined in the pump housing;

a dry space defined in the motor housing;

a stator containing the stator poles, the stator windings and the stator yoke being disposed in the motor housing;

a partition separating the pump space from the dry space, the partition being disposed in an axial gap between the pump rotor and the plurality of axially parallel oriented stator poles, wherein the stator is surrounded by a flexible foil, and at least a large part of the foil is disposed inside the motor housing radially around the stator windings; and a plate made of metal or metallized plastic material wherein parts of the foil are disposed between the stator yoke and the plate, wherein the foil comprises fastening lugs that are bent perpendicularly toward the axis of symmetry of the foil, the fastening lugs being held between the stator yoke and the plate.

14. The DC motor according to claim 13, wherein the foil is electrically connected to the plate.

15. The DC motor according to claim 13, characterized in that the foil is fastened by means of screws between the stator yoke and the plate.

16. A DC motor according to claim 13, wherein an electrical connection to the stator yoke is established by way of the fastening lugs.

* * * * *